United States Patent Office 2,900,283
Patented Aug. 18, 1959

2,900,283
PROCESS AND PRODUCT TO INHIBIT SUGAR INVERSION

Joe W. McGahen, Wilmington, Del., assignor to E. I. du Pont de Nemours and Company, Wilmington, Del., a corporation of Delaware No Drawing. Application June 19, 1957
Serial No. 666,756

5 Claims. (Cl. 127—30)

This invention is directed to preventing sucrose inversion in sugar cane juice and is more particularly directed to compositions and methods for controlling microorganisms causing sucrose inversion in raw sugar cane juice.

In the manufacture of sugar from sugar cane, the juice of the sugar cane stalk is first extracted from shredded cane by crushing the cane between rollers. The shredded cane passes through a series of rollers with water or thin juice being added to the cane macerate to further facilitate extraction. The juice obtained is acid, having a pH usually between about 5.0 and 5.5, and its temperature is below 55° C. The sucrose in this juice is subject to undesirable inversion due to the metabolic activities of microorganisms present.

Inversion proceeds in this juice until the clarification step when the juice is heated to a temperature above 200° F. and also is made alkaline by raising the pH to about 7.5 to 8.3 through lime addition. No microbial inversion difficulties are encountered in the cane juice after clarification in subsequent manufacturing states.

This sucrose inversion in raw cane juice by microorganisms during extraction and prior to clarification results in a build-up of invert sugars. Such inversion not only causes a loss of product but also makes the crystallization of sucrose difficult and expensive. The microorganism chiefly responsible for such inversion is *Leuconostoc mesenteroides* (Cienkowski) Van Tieghem.

It has now been found that the inversion losses can be avoided by treating the raw cane juice with one or more compounds selected from the following general formula:

1. 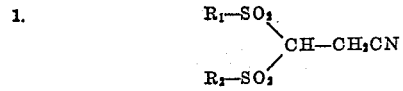

where $R_1$ and $R_2$ are the same or different alkyl groups of 1 through 4 carbon atoms.

These compounds and methods for their preparations are disclosed in U.S. patent application Serial No. 657,721, filed May 8, 1957.

The compounds within the scope of Formula 1 above are particularly suitable for preventing microbial inversion of sucrose in sugar manufacture. These compounds have been found to exhibit a high degree of activity against the microorganisms commonly found in raw cane juice which cause sucrose inversion. The compounds are not highly toxic to warm-blooded animals and they are not corrosive to such equipment as is usually found in a sugar mill.

Also, the compounds have the unusual property of being stable at low pH and low temperatures while being unstable at high pH and somewhat elevated temperatures. Thus, the compounds are destroyed during the clarification step of the sugar manufacturing process and their decomposition products do not crystallize under the conditions employed to crystallize sucrose.

Thus, in practice, one or more compounds selected from Formula 1 are added to raw cane juice. The active compound or compounds used are applied at amounts sufficient to exert the desired prevention or control of sucrose inversion. The exact quantity of active materials used in a given instance can be determined readily by those skilled in the art using conventional techniques. The dosage is, of course, dependent upon the particular ingredient employed, the type and duration of treatment, the types of microorganisms, climatic conditions and the like. In general, application rates of from 0.02 to 0.10 pounds of active compound per treated ton of raw cane juice have been found to be satisfactory for inversion control under usual conditions during the entire length of time after extraction and prior to clarification.

In order that the invention can be better understood, the following specific illustrative examples are given in addition to those already indicated above.

EXAMPLE 1

A series of determinations were carried out with organisms isolated from raw can juice wherein the amounts of 3,3-bis(ethylsulfonyl)propionitrile necessary to give complete or partial inhibition of growth were described. In these determinations, seven organisms which had been isolated from raw cane juice by appropriate bacteriological methods and grown in pure culture were used. To a growth medium containing 1% Bacto peptone, 0.5% yeast extract and 10% sucrose and to cane juice which had been heated and filtered in order to remove solid material, amounts of 3,3-bis(ethylsulfonyl)propionitrile were added to obtain concentrations of 40, 20, 8, 6, 4, 2, and 1 micrograms per milliliter. The growth medium and the cane juice containing the inhibitor were inoculated with pure cultures of the seven organisms and incubated at 37° C. for 19 hours after which time growth was determined. Table 1 sets forth these determinations:

Table 1

| Medium | Inhibition | Mcg. per ml. necessary for Inhibition Organism No. | | | | | | |
|---|---|---|---|---|---|---|---|---|
| | | 1 | 2 | 3 | 4 | 5 | 6 | 7 |
| Growth Medium | Partial | | | | | | | |
| | Complete | 20 | 20 | 20 | 20 | 20 | 20 | 10 |
| Cane Juice | Partial | | 1 | | | 1 | | |
| | Complete | 2 | 2 | <1 | <1 | 2 | <1 | <1 |

EXAMPLE 2

*Leuconostoc mesenteroides*, isolated from raw cane juice was grown in 1% peptone, 0.5% yeast extract and 10% sucrose medium. The cells were harvested by centrifugation and resuspended in M/15 phosphate buffer containing 0.5% sucrose. The inhibition of fermentation of these cells by 3,3-bis(ethylsulfonyl)propionitrile as calculated from carbon dioxide evolution was determined in a Warburg Respirometer and is set forth in Table 2:

Table 2

| Mcg./ml. of 3, 3-bis(ethylsulfonyl)propionitrile | Percent of Inhibition of Fermentation |
|---|---|
| 200 | 98 |
| 20 | 80 |
| 2 | 22 |

EXAMPLE 3

Subsequent to sucrose inversion, an increase of acidity due to the production of acid by microorganisms occurs in raw cane juice. The acidity is undesirable since manufacturing difficulties are encountered—particularly filtration difficulties. In order to describe the effect of 3,3-bis(ethylsulfonyl)propionitrile on microbial acid production, a series of determinations were carried out wherein the compound was added in amounts to equal 10 and 20 micrograms per milliliter to a growth medium containing 1% Bacto peptone, 0.5% yeast extract and 10% sucrose and the growth medium was inoculated with a pure culture of *Leuconostoc mesenteroides*. The pH changes were determined after various incubation periods. These determinations are set forth in Table 3:

Table 3

| Mcg./ml. of 3, 3-bis(ethylsulfonyl) propionitrile | Units pH Change after Hours Incubation | | | | |
|---|---|---|---|---|---|
| | 7 | 24 | 28 | 31 | 48 |
| 10 | 0 | 1.24 | 1.49 | 1.61 | 2.5 |
| 20 | 0 | 0 | 0.64 | 1.24 | 2.0 |
| 0 | 1.2 | 1.9 | 2.0 | 2.4 | 2.4 |

EXAMPLE 4

A series of determinations were carried out to describe the effects of 3,3-bis(ethylsulfonyl)propionitrile on sucrose inversion. To a growth medium containing 1% Bacto peptone, 0.5% yeast extract and 10% sucrose, amounts of 3,3-bis(ethylsulfonyl)propionitrile were added to equal 10 and 20 micrograms per milliliter. The growth medium containing the compound was inoculated with a pure culture of *Leuconostoc mesenteroides* and the inhibition of sucrose inversion determined at various incubation periods. The inhibition of sucrose inversion is set forth in Table 4:

Table 4

| Mcg./ml. of 3,3-bis(ethylsulfonyl)propionitrile | Percent of Inhibition of Inversion per Hours Incubation | | | | |
|---|---|---|---|---|---|
| | 7 | 24 | 28 | 31 | 48 |
| 10 | 100 | 87 | 80 | 75 | 43 |
| 20 | 100 | 100 | 100 | 98 | 76 |

EXAMPLE 5

A series of stability determinations were carried out by adjusting solutions of 3,3-bis(ethylsulfonyl)propionitrile to pH's of 2.7, 6.6, and 7.6 with phosphate buffer and heating in a water bath at 100° C. for various periods. The stability was determined by assaying the solutions by a method wherein an amount of the solution was placed on a filter paper disk, the disk placed on the surface of nutrient agar medium seeded with *Candida albicans* and after incubation determining the zone of inhibition around the disk. The results of the foregoing determinations are set forth in Table 5:

Table 5

| Time (Min.) | pH | Temperature, ° C. | Zone Size (mm.) | Percent of 0 Time |
|---|---|---|---|---|
| 0 | 2.7 | 100 | 33.6 | 100 |
| | 6.6 | 100 | 30.6 | 100 |
| | 7.7 | 100 | 29.8 | 100 |
| | 6.6 | 25 | 32.0 | 100 |
| 5 | 2.7 | 100 | 34.0 | 101 |
| | 6.6 | 100 | 30.0 | 98 |
| | 7.7 | 100 | 24.3 | 82 |
| | 6.6 | 25 | 32.5 | 102 |
| 10 | 2.7 | 100 | 32.6 | 97 |
| | 6.6 | 100 | 31.1 | 102 |
| | 7.7 | 100 | 23.6 | 79 |
| | 6.7 | 25 | 32.6 | 102 |
| 20 | 2.7 | 100 | 33.2 | 99 |
| | 6.6 | 100 | 29.2 | 95 |
| | 7.6 | 100 | 21.2 | 71 |
| | 6.6 | 25 | 28.6 | 90 |
| 40 | 2.7 | 100 | 32.6 | 97 |
| | 6.6 | 100 | 25.3 | 83 |
| | 7.6 | 100 | 0 | 0 |
| | 6.6 | 25 | 31.2 | 98 |
| 105 | 2.7 | 100 | 33.0 | 98 |
| | 6.6 | 100 | 17.3 | 57 |
| | 7.6 | 100 | 0 | 0 |
| | 6.6 | 25 | 32.0 | 100 |

EXAMPLES 6–12

In extracting the juice from sugar cane, the cane is chopped and shredded without loss of juice and then crushed between rollers. The shredded cane passes through a series of rollers with water or thin juice being added to the macerate after each roller except the last one. The cane juice is pumped to weighing tanks. The pH of the fresh juice is acid (5.0–5.5). From the weighing tanks the juice is pumped to liming tanks where the temperature is raised to above 200° F. and the pH is raised to 7.5–8.3. In the method described in the present invention, one or more of the compounds of Formula 1 are added to the cane juice prior to its being pumped to the weighing tanks. The cane juice is protected against sucrose inversion caused by microorganisms before being heated and limed. The compounds are then destroyed by the high temperature and the high pH of the juice in the liming tanks and subsequent processing steps. The amounts of the compounds of Formula 1 necessary to provide the desired protection of raw cane juice from sucrose inversion are set forth in Table 6:

Table 6

| Example No. | Compound | Rate of Addition to Raw Cane Juice (Lbs./Ton) | Effective Time of Treatment before Liming and Heating, hours | Effects |
|---|---|---|---|---|
| 6 | 3,3-bis(methylsulfonyl)propionitrile. | 0.06–0.08 | 8 | Inhibition of growth, fermentation, acid production and sucrose inversion. |
| 7 | 3,3-bis(ethylsulfonyl)propionitrile. | 0.02–0.04 | 8–24 | Do. |
| 8 | 3,3-bis(propylsulfonyl)propionitrile. | 0.06–0.08 | 8 | Do. |
| 9 | 3,3-bis(butylsulfonyl)propionitrile. | 0.08–0.12 | 8 | Do. |
| 10 | 3-methylsulfonyl, 3-ethylsulfonyl propionitrile. | 0.04–0.08 | 8 | Do. |
| 11 | 3-ethylsulfonyl, 3-propylsulfonyl propionitrile. | 0.04–0.08 | 8 | Do. |
| 12 | 3-methylsulfonyl, 3-butylsulfonyl propionitrile. | 0.08–0.12 | 8 | Do. |

I claim:

1. The method of inhibiting sucrose inversion caused by microorganisms in raw cane juice comprising the addition to such juice of at least one compound selected from the formula:

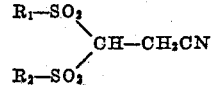

where $R_1$ and $R_2$ are each selected from the group consisting of alkyl groups containing 1 through 4 carbon atoms.

2. A composition adapted for the prevention of sucrose inversion which contains raw cane sugar juice admixed with at least about 0.02 pound per ton of at least one compound represented by the formula described in claim 1.

3. The method of inhibiting sucrose inversion caused by microorganisms in raw cane juice comprising the addition to such juice of at least about 0.02 pound per ton of 3,3-bis-(ethylsulfonyl)propionitrile.

4. The method of inhibiting sucrose inversion caused by microorganisms in raw cane juice comprising the addition to such juice of about 0.02 lb. to 0.1 lb. per ton of 3,3-bis(ethylsulfonyl)propionitrile.

5. A composition adapted for the prevention of sucrose inversion which contains raw sugar cane juice admixed with at least about 0.02 pound per ton of 3,3-bis(ethylsulfonyl)propionitrile.

References Cited in the file of this patent

UNITED STATES PATENTS 2,802,021   Heininger _____ Aug. 6, 1957

OTHER REFERENCES

Bohme et al.: Chem. Abstr., vol. 40 (1944), pp. 2809–2811.